Dec. 29, 1942.  E. E. WILSON  2,306,580
INTERNAL COMBUSTION ENGINE
Filed Jan. 4, 1936   2 Sheets-Sheet 1

Inventor
Ernest E. Wilson
By Blackmore, Spencer & Flint
Attorneys

Dec. 29, 1942.    E. E. WILSON    2,306,580
INTERNAL COMBUSTION ENGINE
Filed Jan. 4, 1936    2 Sheets-Sheet 2

Inventor
Ernest E. Wilson
By Blackmore, Spencer & Fluck
Attorneys

Patented Dec. 29, 1942

2,306,580

UNITED STATES PATENT OFFICE 2,306,580

INTERNAL COMBUSTION ENGINE

Ernest E. Wilson, Huntington Woods, Mich., assignor to General Motors Corporation, Detroit, Mich., a corporation of Delaware Application January 4, 1936, Serial No. 57,583

2 Claims. (Cl. 123—55)

The intermittent withdrawal of air or a mixture of fuel and air from the intake manifold and the intermittent discharge of burned gases into the exhaust manifold of a multi-cylinder internal combustion engine by each cylinder thereof produce in the manifolds series of pressure impulses which travel toward the atmosphere at a definite speed which is about equal to that of sound. By the interval in the cycle of operation of one cylinder at which the pressure impulses from the other cylinders arrive at its ports, the operating characteristics of an internal combustion engine, such as its rate of fuel consumption, its tendency to detonate, its power output and the temperature of its exhaust gases, are very considerably affected.

Upon the foregoing considerations, procedures by which the interval in the cycle of operation of one cylinder at which pressure impulses from the other cylinders arrive at its ports may be determined and expedients by which the interval in the cycle of operation of one cylinder at which pressure impulses from the other cylinders arrive at its ports may be altered, this invention is based.

The determination of the interval in the cycle of operation of one cylinder at which pressure impulses from the other cylinders arrive at its ports is preferably made by analysis of the variations in the pressures within a cylinder of the engine and within its intake and exhaust manifolds near the cylinder during the intake and exhaust periods of the cylinder. But an alternative method of determination of the mentioned condition, which is applicable to proposed as well as to existing systems and, consequently, eliminates much experimental work and testing, is available, viz., a study of the factors, hereinafter enumerated, which determine the interval in the cycle of operation of one cylinder of an engine at which pressure impulses from the other cylinders arrive at its ports.

How the interval in the cycle of operation of one cylinder at which pressure impulses from the other cylinders arrive at its intake ports may be altered will be made clear by the following specification and the accompanying drawings wherein the application of my invention to the exhaust system of a representative type of internal combustion engine is described and illustrated.

In the accompanying drawings:

Figure 1 is a top plan view of an internal combustion engine.

Figure 2 is a chart in which the variations in pressure within a cylinder and within the charging system and the exhaust box of the engine shown in Figure 1 near the cylinder at an engine speed of 720 R. P. M. are graphically represented.

Figure 1:
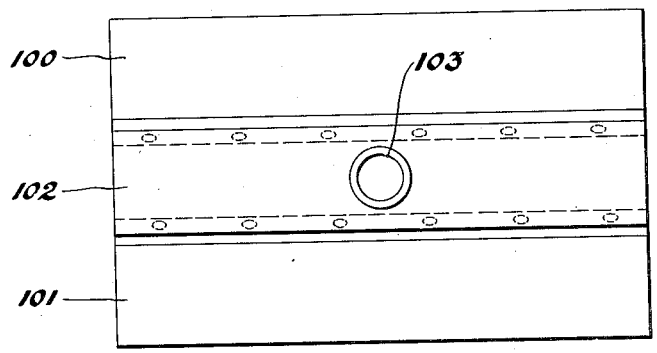

In the practice of my invention in connection with engines which are already equipped with complete intake and exhaust systems, the first step, in accordance with the preferred procedure, is to obtain data with respect to the pressure conditions within a cylinder and within the intake and exhaust manifolds of the engine near the cylinder at different positions of the crankshaft during the intake and exhaust periods of the engine while the engine is equipped with its complete intake and exhaust systems. In the cases of variable speed engines, the prescribed data should be taken while the engine is operating at several different speeds but, in the cases of constant speed engines, the data need be taken only while the engine is operating at the speed at which it is designed to operate. The prescribed data may be obtained by means of any suitable pressure recording gauge.

The next step, in accordance with the preferred procedure, consists in analyzing the data obtained during the first step to determine the interval in the cycle of operation of the cylinder under consideration at which pressure impulses from the other cylinders arrive at its ports.

The third and final step, in accordance with the preferred procedure, which, of course, need be taken only in the event the second step reveals that pressure impulses from another cylinder or cylinders arrive at the ports of that under consideration at such an interval in its cycle of operation that they unfavorably affect the operation of the engine, is to determine how the undesirable condition may be eliminated and make the alterations necessary to eliminate it.

To supplement the foregoing outline and to render the nature and application of my invention more readily comprehensible, I shall show how it has been applied to the internal combustion engine shown in the drawings.

The engine shown in Figure 1 of the drawings is a large stationary V-type Diesel of the two-stroke cycle type in which the two banks 100 and 101 of cylinders are disposed at an angle of 60° to each other. In each of the banks 100 and 101, there are six cylinders which, numbered consecutively from left to right of bank 100 and then from left to right of bank 101, fire in pairs in the order 1 and 6, 7 and 12, 2 and 5, 8 and 11, 3 and 4, 9 and 10. The intake ports of the several cylinders are opened and closed by the pistons 50° before and after bottom dead center, respectively. Each cylinder is equipped with two poppet exhaust valves which open 73° before and close 43° after bottom dead center. Fuel and air are supplied to the several cylinders of the engine by suitable injectors and blowers, respectively. The burned gases are discharged from the several cylinders into the single compartment exhaust box 102 and are conducted therefrom to the atmosphere through the opening 103 in the top of the exhaust box and an exhaust pipe and muffler which are not shown in the drawings.

It is apparent that an engine of the type under consideration, in which the combustion supporting air scavenges the cylinders by pushing the residue of burned gases out before it, will not perform with maximum efficiency if the front of the charge of air does not reach the exhaust ports of the cylinders before the exhaust valves close or reaches them sufficiently in advance of the closing of the exhaust ports that a considerable volume of the air is discharged into the exhaust box because in the former event the cylinder is not entirely rid of burned gases and in the latter event the value of the pressure in the cylinder when the fuel is injected into is not as high as it should be. My experiments have shown that, in an engine of the type under consideration in which the combustion supporting and scavenging air is supplied to the cylinders at an approximately constant rate, the extent to which the ideal condition, viz., that at which the front of the charge of air reaches the exhaust ports of the cylinders just as the exhaust valves close, is approached depends upon the pressure conditions in the exhaust box of the engine at the exhaust ports of the cylinders during their charging-scavenging periods. If the pressure in the exhaust box at the exhaust ports of a cylinder reaches a value in excess of the charging pressure while the exhaust ports are open during the charging-scavenging period of the cylinder, incomplete scavenging and charging will naturally result. If, during the charging-scavenging period of a cylinder, the pressure in the exhaust box at the exhaust ports of the cylinder falls below the charging pressure for any considerable period after scavenging and charging have been completed, combustion supporting air will be discharged into the exhaust box. The ideal attainable condition is that at which the pressure in the exhaust box at the exhaust ports of the cylinder gradually declines from the time the intake port of the cylinder opens until the exhaust valves thereof reach their fully opened positions and then gradually increases to a value which approximates the charging pressure at the time the exhaust valves close.

A study of the exhaust system of the engine shown in Figure 1 was initiated because the engine failed to perform comparably with an eight cylinder engine of the same general mechanical design. The prescribed data with respect to the pressures within a cylinder and within the charging system and the exhaust box near the cylinder were taken while the engine was operating at the speed of 720 R. P. M. Curves which represent the variations in pressure at the designated points in units of pounds per square inch above atmospheric pressure plotted against crank angle in degrees while the engine was operating at the specified speed are reproduced in Figure 2. In this figure, the solid line curves represent the variations in the pressure within the cylinder, the dotted line curves the variations in the pressure within the charging system, and the dash line curves the variations in the pressure within the exhaust box.

Figures 2, 5:
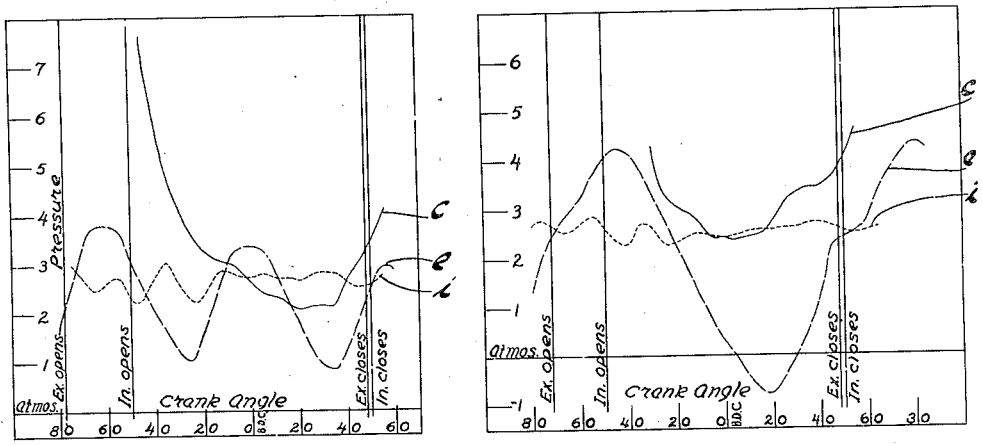
Figure 5 is a chart, similar to that shown in Figure 2, with respect to the engine shown in Figure 1 equipped with the exhaust box shown in Figures 3 and 4.

An examination of the curves shown in Figure 2 shows how far the pressure conditions in the engine shown in Figure 1 were from the ideal and why the engine did not come up to expectations in performance, viz., because the pressure in the exhaust box was too high at the middle of the charging and too low at the end of the scavenging periods of the cylinders. The former condition resulted in backflow of burned gases into the charging system and prevented complete replacement with fresh air of the burned gases in the cylinders. The latter condition permitted some of the combustion supporting air to escape into the exhaust box.

It is quite clear that the peak in the curve of pressure variations in the exhaust box at about bottom dead center of the cylinder under consideration is not attributable to any action of that cylinder. My experiments have shown that this pressure peak is attributable to the arrival at the exhaust ports of the cylinder under consideration at about bottom dead center of the peak of a pressure impulse or the peaks of pressure impulses from another cylinder or cylinders which impedes the discharge of burned gases from the cylinder under consideration. Consideration of the timing and firing frequency of the engine under consideration renders it quite clear that the peak in the curve of pressure variations in the exhaust box at about bottom dead center is attributable to pressure impulses produced by the cylinders which fire at the same time as and immediately (60°) after that under consideration.

The foregoing explanation of the presence of the peak in the curve of pressure variations in the exhaust box at about bottom dead center of the cylinder under consideration renders it clear that its existence might have been predicted from a consideration of the factors which determine the interval in the cycle of operation of one cylinder at which pressure impulses from another cylinder reach its exhaust ports, viz., the firing order, the firing frequency and the timing of the engine and the distance which pressure impulses from one cylinder must travel to reach the exhaust ports of the others. However, it may be well to note that, except in connection with large engines, it is generally necessary to consider only the second and third mentioned factors to determine whether and, if so, at what speed of the engine the undesirable pressure condition under consideration will occur.

From what has been said, it is quite apparent that if the peaks of the pressure impulses from the cylinders which fire at the same time as and immediately after that under consideration did not arrive at the exhaust ports of the latter during its scavenging period, the cylinder under consideration would be more nearly completely freed of burned gases and, consequently, the operation of the engine would be improved. The arrival at the exhaust ports of the cylinder under consideration of pressure impulses from the cylinders which fire at the same time as and immediately after it can, of course, be entirely prevented by providing separate exhaust systems for the two groups of cylinders. But, consideration of the fact that the pressure impulses travel at a definite rate of speed indicates that it is also possible to prevent the pressure impulses produced by the cylinders which fire at the same time as and immediately after that under consideration from arriving at the exhaust ports of the latter at such an interval in its cycle of operation that they affect the operation of the engine unfavorably by altering the exhaust system of the engine so as to change the distances which these pressure impulses must travel to reach the exhaust ports of the cylinder under consideration.

The first of the expedients suggested above may be applied to the exhaust system of the engine shown in Figure 1 by subdividing the exhaust box 102 so that no two cylinders which fire simultaneously or successively exhaust into the same compartment. Each of the compartments of the exhaust box may be connected to the atmosphere independently of the others, but, in the interest of economy, it is, of course, desirable to conduct the burned gases from the several compartments to the atmosphere through a single pipe. The necessary interconnection of the several compartments can be made without recreating the undesirable pressure condition within the cylinder under consideration and, as a matter of fact, with benefit to the pressure condition therein at a selected speed of operation of the engine by interconnecting the compartments into which cylinders which fire successively exhaust by ducts of such lengths that the peaks of the pressure impulses from the later firing cylinders arrive at the exhaust ports of the earlier firing cylinders near the end of the scavenging instead of in the middle of the charging periods of the latter and prevent escape of combustion supporting air into the exhaust box near the ends of the scavenging periods instead of impeding the discharge of burned gases from the cylinders during the middle of these periods.

Figure 4:
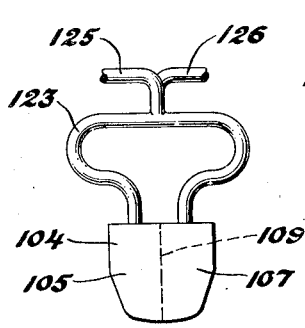
Figure 4 is an end elevation of the exhaust box shown in Figure 3.
Figure 3:
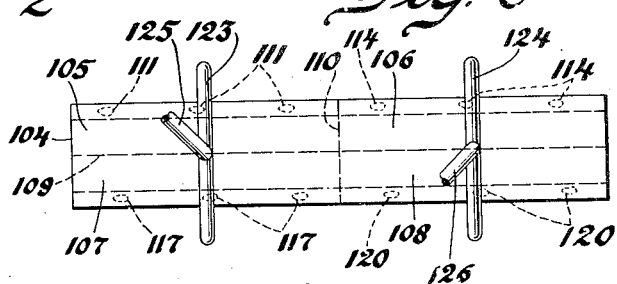
Figure 3 is a top plan view of a modified form of exhaust box for the engine shown in Figure 1.

An exhaust system for the engine shown in Figure 1 designed in accordance with the foregoing considerations is shown in Figures 3 and 4. It consists of a hollow structure 104, similar to the exhaust box 102, divided into four non-communicating compartments 105, 106, 107 and 108 by longitudinally and transversely extending partitions 109 and 110. In the inclined lower portions of the side walls of the box 104, there are provided openings 111, openings 114, openings 117 and openings 120, through which burned gases may be conducted from the exhaust ports of the first, second and third, the fourth, fifth and sixth, the seventh, eighth and ninth, and the tenth, eleventh and twelfth cylinders of the engine into the compartments 105, 106, 107 and 108, respectively. To conduct burned gases from the exhaust box to the atmosphere, there are provided what may be called Y's 123 and 124. The branches of the Y's 123 and 124 are connected, respectively, to the compartments 105 and 107 and to the compartments 106 and 108 of the exhaust box and are made of such lengths that when the engine is operating at the speed at which it is desired it shall perform with maximum efficiency the peaks of the pressure impulses from the later of successively firing cylinders reach the exhaust ports of the earlier near the end of the scavenging periods of the latter. In the particular case under consideration the branches of the Y's were made about eight feet long. The "stems" 125 and 126 of the Y's 123 and 124 may communicate independently with the atmosphere or may be joined and connected to the atmosphere by a single pipe. Interconnection of the stems 125 and 126 of the Y's 123 and 124 will not result in any considerable degree of interference between the cylinders which exhaust into the compartments at the opposite ends of the exhaust box because the pressure impulses from the cylinders which exhaust into the compartments at one end of the exhaust box will be greatly attenuated before they reach the exhaust ports of any cylinder which exhausts into a compartment at the other end of the exhaust box.

Curves, plotted and designated similarly to those shown in Figure 2, which represent the variations in the pressures within a cylinder and within the charging system and the exhaust box of the engine shown in Figure 1 while equipped with the exhaust system shown in Figures 3 and 4 and operating at a speed of 720 R. P. M. are reproduced in Figure 5. An examination of the curves shown in Figure 5 indicates that, although the value of the pressure at the end of the scavenging period is not quite as high as it should be, approximately what was described as the ideal pressure condition in the exhaust box has been attained by substituting the exhaust system shown in Figures 3 and 4 for that shown in Figure 1. The peak in the curve of pressure variations in the exhaust box near bottom dead center has been eliminated and this curve as a whole closely follows that which has been described as the ideal. As might have been predicted from an examination of the curves shown in Figure 5 or from a consideration of the factors which determine the interval in the cycle of operation of one cylinder at which pressure impulses from another cylinder or cylinders arrive at its exhaust ports, substitution of the exhaust system shown in Figures 3 and 4 for that shown in Figure 1 improved the operation of the engine shown in Figure 1 very considerably.

Figure 6:
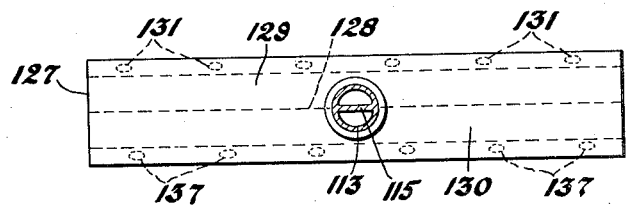
Figure 6 is a top plan view of another exhaust box for the engine shown in Figure 1.
Figure 7:
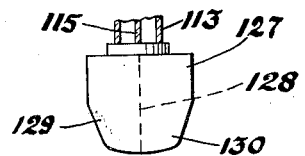
Figure 7 is an end elevation of the exhaust box shown in Figure 6.

Other exhaust systems suitable for the engine shown in Figure 1 may be designed in accordance with the principles which have been set forth. One of simplier design than that shown in Figures 3 and 4 is shown in Figures 6 and 7. It consists of an exhaust box 127, similar to that shown in Figure 1, subdivided by a longitudinally extending partition 128 into two non-communicating compartments 129 and 130. In the inclined portions of the side walls of the box 127, there are provided openings 131 and openings 137 through which burned gases may be conducted from the exhaust ports of the cylinders in the bank 100 and the bank 101 into the compartments 129 and 130, respectively. To conduct burned gases from the exhaust box to the atmosphere, there is provided a pipe 113 which communicates with both of the compartments and is subdivided by a partition 115 whose lower end rests on and constitutes a continuation of the partition 128. The partition 115 need not extend to the outer end of the pipe 113 but should extend such a distance from the exhaust box that the distance the pressure impulses produced by the later of each of the several pairs of successively firing cylinders must travel to reach the exhaust ports of the earlier is such that they reach them at such intervals in their cycles of operation that in the total the unfavorable effect of the pressure impulses on the discharge of burned gases from the several cylinders is minimized. And it is apparent that the distance which the partition 115 extends from the exhaust box may be made such that, when the engine is operating at the speed at which it is desired it should perform with maximum efficiency, the peaks of the pressure impulses produced by the later of each of two or more pairs of successively firing cylinders reach the exhaust ports of the earlier near the ends of their scavenging periods and prevent escape of combustion supporting air therefrom into the exhaust box at this time.

While the exhaust system shown in Figures 6 and 7 does not eliminate interference by the pressure impulses produced by one a pair of simultaneously firing cylinders with the discharge of burned gases from the other and is not capable of regulating accurately, with respect to as many cylinders as the exhaust system shown in Figures 3 and 4, the interval in the cycle of operation of the earlier of successively firing cylinders at which pressure impulses from the later reach its exhaust ports, nevertheless, as was to be expected, the engine shown in Figure 1 performed more efficiently when equipped with the exhaust box shown in Figures 6 and 7 than when equipped with the exhaust box shown in Fig. 1.

Figure 8:
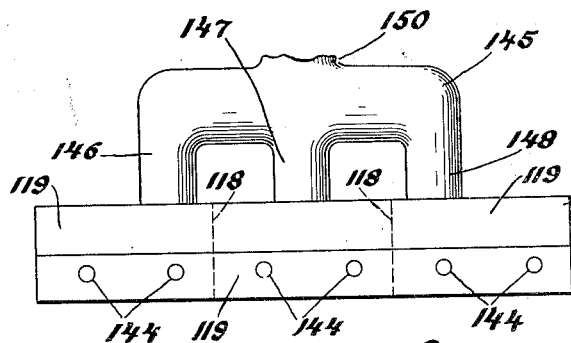
Figure 8 show, in side elevation, a fourth exhaust box and the exhaust piping for the engine shown in Figure 1.
Figure 9:
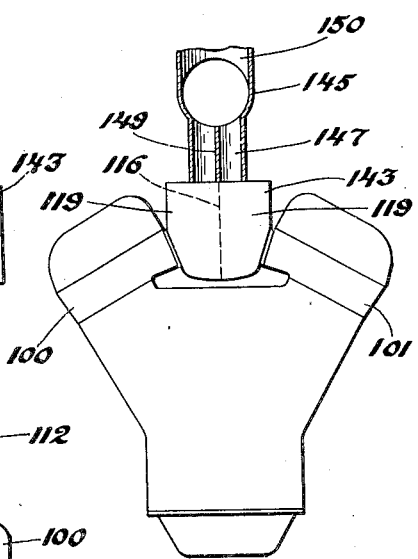
Figure 9 is an end elevation of the engine shown in Figure 1 equipped with the exhaust box and the exhaust piping shown in Figure 8.

Another exhaust system for the engine shown in Figure 1 is shown in Figures 8 and 9. It includes an exhaust box 143, similar to that shown in Figure 1, subdivided by a longitudinally extending partition 116 and two transversely extending partitions 118 into six non-communicating compartments 119. Each of the compartments 119 is connected by a pair of the openings 144 in the inclined lower portions of the side walls of the box 143 with the exhaust ports of one of the following pairs of cylinders, viz., 1 and 2, 3 and 4, 5 and 6, 7 and 8, 9 and 10, 11 and 12. The burned gases are conducted from the several compartments of the exhaust box to the atmosphere through a manifold on which there is formed an outlet nozzle 150 and three branches 146, 147 and 148. Through openings in the top wall of the exhaust box, the branch 146 is connected to the compartments to which the first and second and the seventh and eighth cylinders are connected, the branch 147 to the compartments to which the third and fourth and the ninth and tenth cylinders are connected, and the branch 148 to the compartments to which the fifth and sixth and eleventh and twelfth cylinders are connected. Each of the branches is subdivided by a partition 149 whose lower end rests on and constitutes an extension of the partition 116.

The exhaust system shown in Figures 8 and 9 eliminates the unfavorable effect on the operating characteristics of the engine shown in Figure 1 of two successively firing cylinders exhausting into the same compartment and also, except in the cases of two pairs of cylinders, of the unfavorable effect of two simultaneously firing cylinders exhausting into the same compartment. Moreover, it will be noted that, if the branches 146, 147 and 148 and the partitions 149 are made of the proper length, the desirable effect on the operation of the earlier of successively firing cylinders of the pressure impulses produced by the later effected by properly dimensioning the lengths of the branches of the Y's 123 and 124 of the exhaust system shown in Figures 3 and 4 may be produced in the exhaust system shown in Figures 8 and 9. Also it will be noted that, when the engine shown in Figure 1 is equipped with the exhaust system shown in Figures 8 and 9, the beneficial effect of the pressure impulses produced by cylinders which fire 120° after other cylinders in increasing the pressure in the exhaust box at the ports of the latter near the ends of their scavenging periods will be greater than when the engine is equipped with the exhaust system shown in the preceding figures because the compartments of the exhaust box are smaller.

Figure 10:
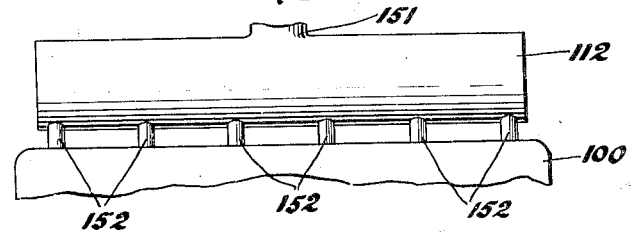
Figures 10 and 11 are, respectively, a side elevation and an end elevation of the engine shown in Figure 1 equipped with a fifth exhaust box.
Figure 11:
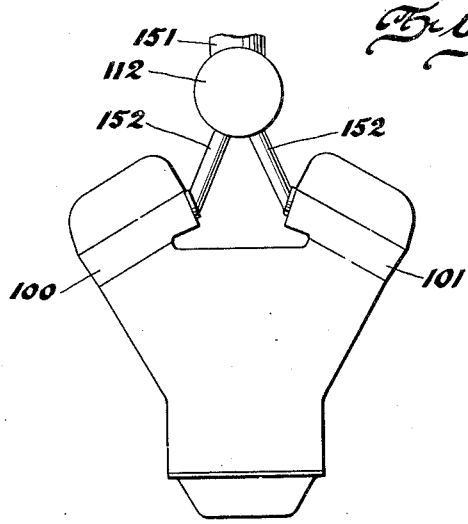

Still another exhaust system for the engine shown in Figure 1 is shown in Figures 10 and 11. In it, there is included a hollow cylinder 112 on which there is formed an outlet nozzle 151. The hollow cylinder 112 is connected to the exhaust port of each of the cylinders of the engine by a tube 152. The tubes 152 are made of such length that the pressure impulses produced by the later of successively firing cylinders of the engine reach the exhaust ports of the earlier firing thereof at such intervals in the cycles of operation of the latter that their unfavorable effect on the discharge of burned gases therefrom is minimized and, preferably, of such length that, when the engine is operating at the speed at which it is desired it should perform with maximum efficiency, the peaks of the pressure impulses produced by the later of successively firing cylinders reach the exhaust ports of the earlier near the ends of the scavenging periods thereof so that they prevent escape of combustion supporting air therefrom into the exhaust system.

Although I have emphasized the experimental method of determining at what interval in the cycle of operation of one cylinder of an engine pressure impulses from other cylinders arrive at its ports, it will, of course, be understood that this condition can be determined by analysis of the factors upon which it depends without experimentation. And although I have referred to the determination of this condition with respect to a single cylinder only of an engine, it will, of course, be understood that if the design of the engine under consideration is such that the condition is not the same for all cylinders, it may be necessary to make separate determinations of the condition with respect to several cylinders. Also, although specifically it does not constitute a feature of the invention with which this application is concerned, it may be pointed out that the interval in the cycle of operation of a cylinder of an engine at which pressure impulses from other cylinders reach its ports may be altered by altering the timing of the engine or the flow characteristics of its ports. In this connection, it may be pointed out that, in part, the change in the characteristics of the engine shown in Figure 1 which is recorded in Figure 5 is attributable to a change in the exhaust timing of the engine.

I claim:

1. In a twelve cylinder, V-type internal combustion engine of the two-stroke cycle type whose cylinders fire in the order 1 and 6, 7 and 12, 2 and 5, 8 and 11, 3 and 4, 9 and 10, an exhaust system which consists of six chambers of which each is connected to one of the following pairs of cylinders, viz., 1 and 2, 3 and 4, 5 and 6, 7 and 8, 9 and 10, 11 and 12, and means for conducting burned gases from the chambers to the atmosphere including bifurcated ducts whose branches are connected, respectively, to the section to which the first and second and the chamber to which the seventh and eighth cylinders are connected, to the chamber to which the third and fourth and the chamber to which the ninth and tenth cylinders are connected, and to the chamber to which the fifth and sixth and the chamber to which the eleventh and twelfth cylinders are connected.

2. In a twelve cylinder, V-type internal combustion engine of the two-stroke cycle type whose cylinders fire in the order 1 and 6, 7 and 12, 2 and 5, 8 and 11, 3 and 4, 9 and 10, an exhaust system which consists of six chambers of which each is connected to one of the following pairs of cylinders, viz., 1 and 2, 3 and 4, 5 and 6, 7 and 8, 9 and 10, 11 and 12.

ERNEST E. WILSON.

CERTIFICATE OF CORRECTION.

Patent No. 2,306,580. December 29, 1942.

ERNEST E. WILSON.

It is hereby certified that error appears in the printed specification of the above numbered patent requiring correction as follows; Page 1, second column, line 16, for "show" read --shows--; page 5, first column, lines 12 and 13, claim 1, for "section" read --chamber--; and that the said Letters Patent should be read with this correction therein that the same may conform to the record of the case in the Patent Office.

Signed and sealed this 16th day of March, A. D. 1943.

(Seal)

Henry Van Arsdale,
Acting Commissioner of Patents.